US012603345B2

(12) United States Patent     (10) Patent No.:   US 12,603,345 B2

Tan et al.     (45) Date of Patent:    Apr. 14, 2026

(54) BATTERY PACK AND VEHICLE

(71) Applicant: BYD COMPANY LIMITED, Shenzhen (CN)

(72) Inventors: Liangwen Tan, Shenzhen (CN); Jing Tan, Shenzhen (CN); Wenhui Chen, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 693 days.

(21) Appl. No.: 18/009,129

(22) PCT Filed: Mar. 30, 2021

(86) PCT No.: PCT/CN2021/083924

§ 371 (c)(1),
(2) Date: Dec. 8, 2022

(87) PCT Pub. No.: WO2021/248986

PCT Pub. Date: Dec. 16, 2021

(65) Prior Publication Data

US 2023/0231223 A1     Jul. 20, 2023

(30) Foreign Application Priority Data

Jun. 9, 2020    (CN) ......................... 202010517961.5

(51) Int. Cl.
H01M 10/615     (2014.01)
H01M 10/613     (2014.01)
(Continued)

(52) U.S. Cl.
CPC ....... H01M 10/615 (2015.04); H01M 10/613 (2015.04); H01M 10/625 (2015.04);
(Continued)

(58) Field of Classification Search
None
See application file for complete search history.

(56) References Cited

U.S. PATENT DOCUMENTS

2013/0009464 A1    1/2013    Firehammer et al.
2018/0337377 A1    11/2018    Stephens et al.

FOREIGN PATENT DOCUMENTS

CN     203589102 U    5/2014
CN     104518258 A    4/2015
(Continued)

OTHER PUBLICATIONS

International Search Report and Written Opinion for Application No. PCT/CN2021/083924, mailed on Jul. 6, 2021, 14 bages.

*Primary Examiner* — Jonathan Crepeau

(74) *Attorney, Agent, or Firm* — Sheppard Mullin Richter & Hampton LLP

(57)          ABSTRACT

A battery pack includes a tray and a vapor chamber. The tray includes two first edge beams, and the two first edge beams are respectively disposed on two opposite sides of a receiving space having a top opening. The vapor chamber is disposed at the top opening of the tray and comprises two opposite first edge portions, and the two first edge portions are respectively mounted on the two first edge beams. One of a first edge beam and a corresponding first edge portion mounted thereon comprises an inner surface that faces the receiving space and includes a clamping slot, and the other one of the first edge beam and the corresponding first edge portion is inserted into the clamping slot.

15 Claims, 6 Drawing Sheets

(51) Int. Cl.

| | |
|---|---|
| *H01M 10/625* | (2014.01) |
| *H01M 10/6554* | (2014.01) |
| *H01M 10/6556* | (2014.01) |
| *H01M 50/209* | (2021.01) |
| *H01M 50/242* | (2021.01) |
| *H01M 50/244* | (2021.01) |
| *H01M 50/249* | (2021.01) |
| *H01M 50/264* | (2021.01) |
| *H01M 50/271* | (2021.01) |

(52) U.S. Cl.

CPC ... *H01M 10/6554* (2015.04); *H01M 10/6556* (2015.04); *H01M 50/209* (2021.01); *H01M 50/242* (2021.01); *H01M 50/244* (2021.01); *H01M 50/249* (2021.01); *H01M 50/264* (2021.01); *H01M 50/271* (2021.01); *H01M 2220/20* (2013.01)

(56) References Cited

FOREIGN PATENT DOCUMENTS

| | | | | | |
|---|---|---|---|---|---|
| CN | 105914428 | A | | 8/2016 | |
| CN | 206412396 | U | | 8/2017 | |
| CN | 107534195 | A | | 1/2018 | |
| CN | 206849903 | U | | 1/2018 | |
| CN | 207338482 | U | | 5/2018 | |
| CN | 207409607 | U | | 5/2018 | |
| CN | 208433488 | U | | 1/2019 | |
| CN | 208570855 | U | | 3/2019 | |
| CN | 208986036 | U | | 6/2019 | |
| CN | 110165113 | A | * | 8/2019 | |
| CN | 209312836 | U | | 8/2019 | |
| CN | 209747613 | U | | 12/2019 | |
| CN | 209822833 | U | | 12/2019 | |
| CN | 210073956 | U | | 2/2020 | |
| CN | 210073974 | U | | 2/2020 | |
| CN | 110998897 | A | | 4/2020 | |
| CN | 210403972 | U | | 4/2020 | |
| CN | 210535786 | U | | 5/2020 | |
| CN | 111668405 | A | | 9/2020 | |
| CN | 211543575 | U | * | 9/2020 | |
| EP | 2355204 | A1 | * | 8/2011 | .......... H01M 50/209 |
| FR | 3085545 | A1 | | 3/2020 | |

* cited by examiner

BATTERY PACK AND VEHICLE

CROSS-REFERENCE TO RELATED APPLICATIONS

This application is a National Phase Application of International Patent Application No. PCT/CN2021/083924 filed with the China National Intellectual Property Administration (CNIPA) on Mar. 30, 2021, which is based on and claims priority to and benefits of Chinese Patent Application No. 202010517961.5 filed on Jun. 9, 2020. The entire content of all of the above-identified applications is incorporated herein by reference.

FIELD

The present disclosure relates to the field of batteries, and more particularly to a battery pack and vehicle.

BACKGROUND

As a main power source of new energy electric vehicles, battery pack directly affects the performance and safety of the electric vehicles. According to a battery pack structure, a tray is generally used to load a power battery and is sealed by a tray cover to form a battery pack, and the battery pack is mounted on an electric vehicle.

In the related art, an edge beam of a tray is designed to be light in weight and cost reductive, but there is a problem of strength of the tray. When a battery pack collides, the edge beam of the tray is easily squashed and deformed, so that a battery pole in the tray is squashed, and safety accidents such as battery short circuit are caused.

SUMMARY

The present disclosure is to resolve at least one of the technical problems in the related art.

As such, the present disclosure provides a battery pack to prevent the battery pack from being squashed and deformed.

The present disclosure also provides a vehicle having the above battery pack.

A battery pack for powering a vehicle according to an embodiment of the present disclosure includes a tray and a vapor chamber; the tray includes first edge beams for enclosing a receiving space having a top opening; the vapor chamber is provided at the top opening of the tray and includes two opposite first edge portions, and both of the first edge portions are mounted on the first edge beams; and a clamping slot is provided on an inner surface of one of the first edge beam and the first edge portion facing the receiving space, and the other of the first edge beam and the first edge portion is inserted into the clamping slot.

According to the battery pack of an embodiment of the present disclosure, by coupling both first edge portions of the vapor chamber with the first edge beams enclosing the receiving space, the vapor chamber supports the first edge beams. When the tray is squashed or crushed, the tray can transmit a force to the vapor chamber, thereby increasing the structural strength of the tray and preventing the first edge beams from deforming to squash the battery module in the receiving space after being squashed, to achieve the purpose of protecting the battery module in the receiving space, so that the operation of the battery module is safe and reliable.

In some embodiments of the present disclosure, the tray has two first edge beams spaced apart, and the two first edge beams respectively cooperate with two first edge portions.

In some embodiments of the present disclosure, the clamping slot is provided on an inner surface of the first edge beam facing the receiving space, and the first edge portion is inserted into the clamping slot of the first edge beam.

In some embodiments of the present disclosure, the first edge portion contacts with or abuts against a bottom wall of the clamping slot, and the first edge portion is adhered to a side wall of the clamping slot.

In some embodiments of the present disclosure, the battery pack further includes a number of cooling tubes provided in sequence on an outer surface of the vapor chamber facing away from the receiving space, and a heater provided between every two adjacent cooling tubes.

In some embodiments of the present disclosure, the cooling tubes are integrally aluminum-extruded with the vapor chamber, and the heaters are heating films.

In some embodiments of the present disclosure, a thickness of the cooling tubes is greater than a thickness of the heating film.

In some embodiments of the present disclosure, the tray further includes two second edge beams provided opposite to each other and a reinforcing beam, the first edge beams and the two second edge beams together enclose the receiving space, and the reinforcing beam is parallel with the second edge beams.

In some embodiments of the present disclosure, the vapor chamber includes a connecting region and a bearing region other than the connecting region, a thickness of the connecting region is greater than a thickness of the bearing region, and the connecting region is connected to the reinforcing beam.

In some embodiments of the present disclosure, the connecting region of the vapor chamber is riveted or screwed to the reinforcing beam.

In some embodiments of the present disclosure, a parallel direction of the reinforcing beam and the second edge beam is a lengthwise extension direction of the reinforcing beam, and two bosses are provided on the inner surface of the vapor chamber facing the receiving space, and the two bosses respectively abut against two end faces of the reinforcing beam along the parallel direction.

In some embodiments of the present disclosure, the vapor chamber is provided with a connecting member for connection to a vehicle.

In some embodiments of the present disclosure, the battery pack further includes a battery module placed in the receiving space, and the vapor chamber is bonded to the battery module.

In some embodiments of the present disclosure, the battery pack further includes a cover plate, where the cover plate is located on the vapor chamber and covers the top opening of the receiving space, and a sealing cushion is provided between the cover plate and the vapor chamber.

The vehicle according to an embodiment of the present disclosure includes the battery pack according to the above embodiment of the present disclosure.

The vehicle according to an embodiment of the present disclosure operates safely and reliably.

Other aspects and advantages of the present disclosure are given in the following description, some of which become apparent from the following description or may be learned from practices of the present disclosure.

BRIEF DESCRIPTION OF THE DRAWINGS

The above and/or additional aspects and advantages of the present disclosure will become obvious and easy to understand through embodiments described with reference with drawings outlined below.

Figure 1:
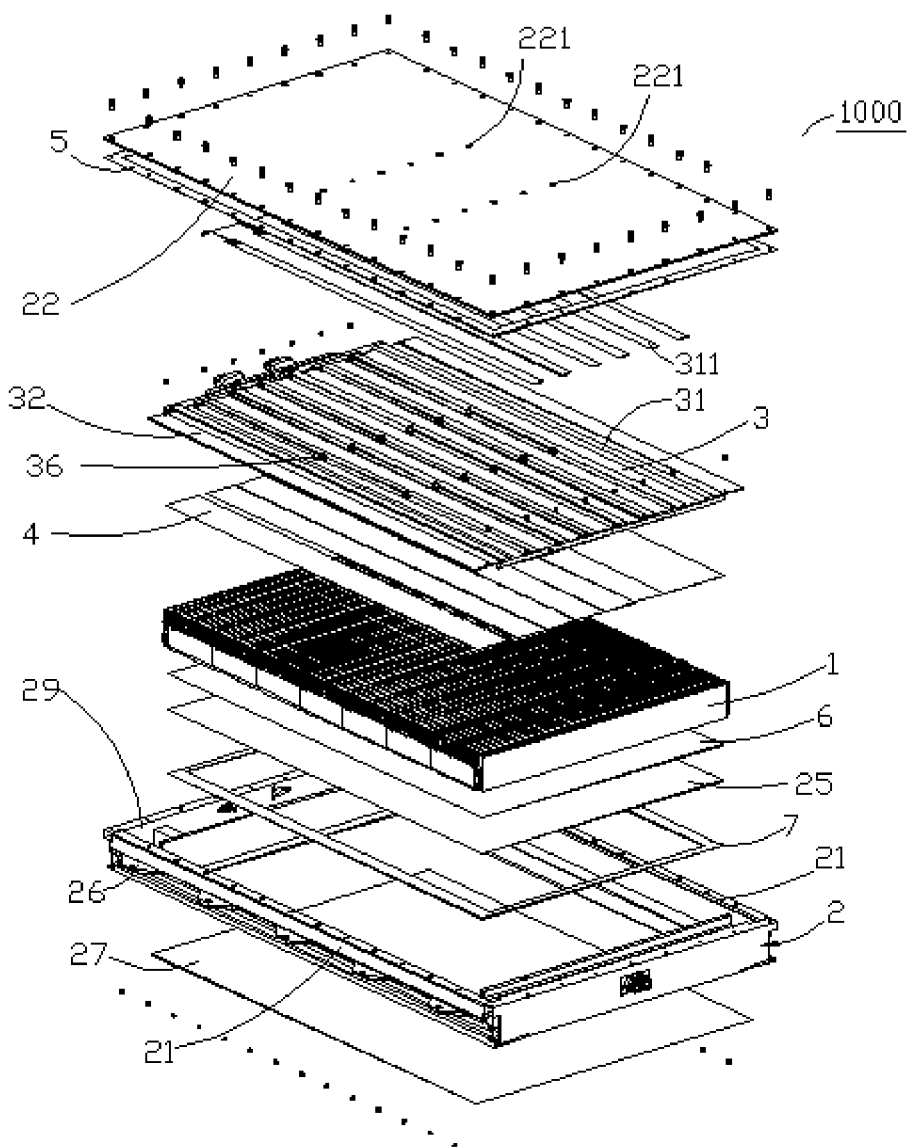
FIG. 1 is an exploded view of a battery pack according to one embodiment of the present disclosure.
Figure 2:
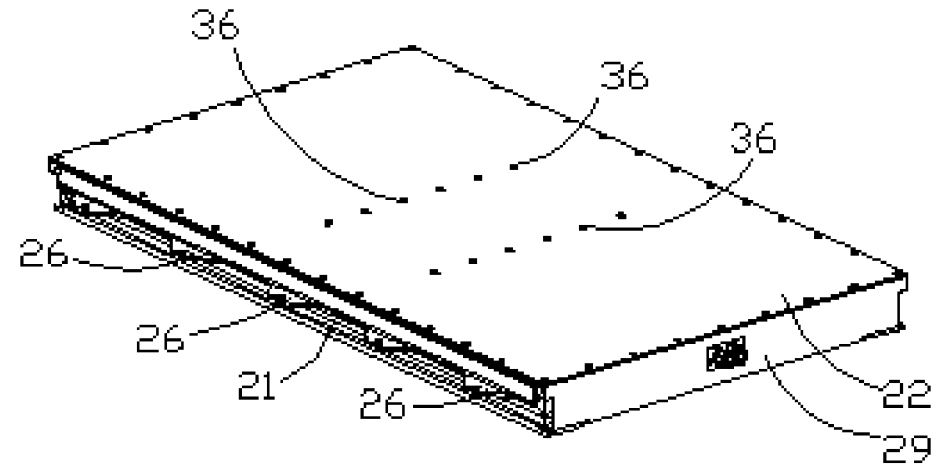
FIG. 2 is an assembly view of a battery pack according to one embodiment of the present disclosure.

REFERENCE NUMERALS battery pack 1000;

battery module 1;

tray 2; first edge beam 21; receiving space 211; clamping slot 212; cover plate 22; through hole 221; reinforcing beam 23; support portion 24; base plate 25; lug 26; fender plate 27; insulating guide plate 28; second edge beam 29;

vapor chamber 3; cooling tube 31; heating film 311; first edge portion 32; boss 33; connecting region 34; bearing region 35; connecting member 36; sealing ring 37;

thermally conductive structural adhesive 4; sealing cushion 5; first structural adhesive 6; second structural adhesive 7.

DETAILED DESCRIPTION

Embodiments of the present disclosure are described in detail below, and examples of the embodiments are shown in accompanying drawings, where the same or similar elements or the elements having same or similar functions are denoted by the same or similar reference numerals throughout the description. The embodiments that are described below with reference to the accompanying drawings are exemplary, and are only used to interpret the present disclosure and cannot be understood as a limitation to the present disclosure.

In the description of the present disclosure, it should be understood that, orientations or position relationships indicated by terms such as "center", "longitudinal", "transverse", "length", "width", "thickness", "up", "down", "front", "back", "left", "right", "vertical", "horizontal", "top", "bottom", "inner", "outer", "clockwise", "counterclockwise", "axial", "radial", and "circumferential" are orientations or position relationship shown based on the accompanying drawings, and are merely used for describing the present disclosure and simplifying the description, rather than indicating or implying that the apparatus or element should have a particular orientation or be constructed and operated in a particular orientation, and therefore, should not be construed as a limitation on the present disclosure. In addition, a feature defined to be "first" or "second" may explicitly or implicitly include one or more features. In the description of the present disclosure, unless stated otherwise, the meaning of "a number of" is two or more than two.

In the description of the present disclosure, it should be noted that unless otherwise explicitly specified or defined, the terms such as "mount", "install", "connect", and "connection" should be understood in a broad sense. For example, the connection may be a fixed connection, a detachable connection, or an integral connection; or the connection may be a mechanical connection or an electrical connection; or the connection may be a direct connection, an indirect connection through an intermediary, or internal communication between two components. A person of ordinary skill in the art may understand the specific meanings of the foregoing terms in the present disclosure according to specific situations.

A battery pack 1000 that may be used to power a vehicle according to an embodiment of the present disclosure is described below with reference to FIGS. 1-10.

The battery pack 1000 according to an embodiment of the present disclosure includes a tray 2 and a vapor chamber 3 (e.g., a thermal plate). The tray 2 includes first edge beams 21 for enclosing a receiving space 211 having a top opening, the vapor chamber 3 is provided at the top opening of the tray 2, the vapor chamber 3 includes two opposite first edge portions 32, and both of the two first edge portions 32 are mounted on the first edge beams 21. One of the first edge beam 21 and the first edge portion 32 is provided with a clamping slot 212 on an inner surface facing the receiving space 211, and the other of the first edge beam 21 and the first edge portion 32 is inserted into the clamping slot 212.

By providing a clamping slot 212 on one of the first edge beam 21 and the first edge portion 32, the other one of the first edge beam 21 and the first edge portion 32 is inserted into the clamping slot 212, so that both the first edge portions 32 of the vapor chamber 3 couple with the first edge beams 21 that enclose the receiving space 211, and the vapor chamber 3 can support the first edge beams 21. When the tray 2 is squashed or crushed, the tray 2 can transmit a force to the vapor chamber 3, thereby increasing the structural strength of the tray 2 and preventing the first edge beams 21 from deforming after being squashed. In addition, since the first edge beam 21 and the first edge portion 32 are fitted by snap-fitting of a clamping slot 212, the reliability of the connection between the first edge beam 21 and the first edge portion 32 can be improved.

The battery pack 1000 further includes a battery module 1 placed in the receiving space 211, and the vapor chamber 3 is located above the battery module 1. The battery module 1 can be provided in the receiving space 211, and by arranging the vapor chamber 3 at the top opening of the receiving space 211 and above the battery module 1, heat exchange can be performed between the vapor chamber 3 and the battery module 1 so as to heat and/or cool the battery module 1, thereby satisfying the cooling requirement of the battery module 1 during charging and discharging and/or satisfying the heating requirement of the battery module 1 in a low-temperature environment.

For example, in some examples, the battery module 1 may be adhered to the vapor chamber 3. More specifically, as shown in FIG. 1, the vapor chamber 3 and the battery module 1 may be adhered by the thermally conductive structural adhesive 4, so that the heat exchange efficiency between the vapor chamber 3 and the battery module 1 may be improved. Of course, the present disclosure is not limited thereto. For example, the battery module 1 and the vapor chamber 3 may not be connected to each other, or may be connected to each other by other means, which will not be described in detail herein.

According to the battery pack 1000 of an embodiment of the present disclosure, by coupling both first edge portions 32 of the vapor chamber 3 with the first edge beams 21 enclosing the receiving space 211, the vapor chamber 3 supports the first edge beams 21. When the tray 2 is squashed or crushed, the tray 2 can transmit a force to the vapor chamber 3, thereby increasing the structural strength of the tray 2 and preventing the first edge beams 21 from deforming after being squashed, to achieve the purpose of protecting the battery module 1 in the receiving space 211, so that the operation of the battery module 1 is safe and reliable. In addition, since the vapor chamber 3 is provided at the top opening of the tray 2 where the first edge beams 21 are easily deformed, the first edge beams 21 can be better prevented from being deformed to squash the battery module 1.

Figure 5:
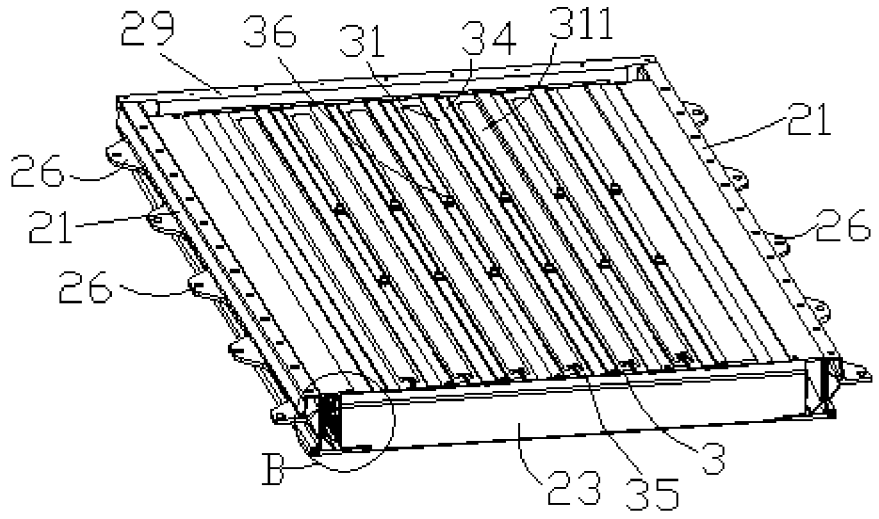
FIG. 5 is another cross-sectional view of a battery pack according to one embodiment of the present disclosure.
Figure 7:
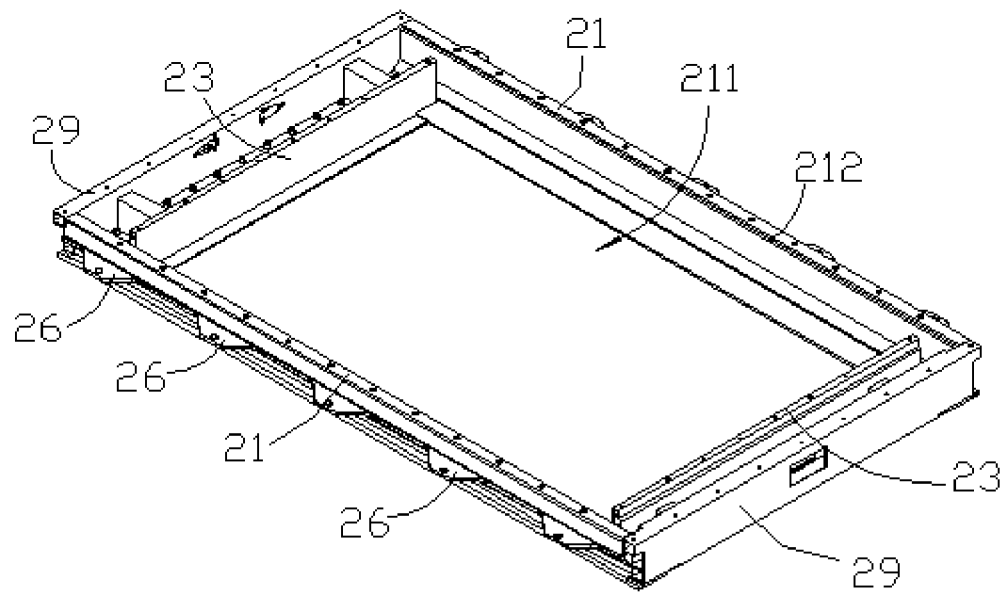
FIG. 7 is a perspective view of a tray according to an embodiment of the present disclosure.

As shown in FIGS. 1, 5 and 7, in some embodiments of the present disclosure, the tray 2 has two first edge beams 21 spaced apart that mate with two first edge portions 32, respectively. It can be appreciated that by respectively engaging the two first edge portions 32 of the vapor chamber 3 with the two first edge beams 21 of the tray 2, the vapor chamber 3 is supported between the two first edge beams 21 so as to prevent the receiving space 211 between the two first edge beams 21 from being deformed after being squashed, thereby serving the purpose of protecting the battery module 1 in the receiving space 211 and to make the operation of the battery module 1 smooth and reliable.

Figure 3:
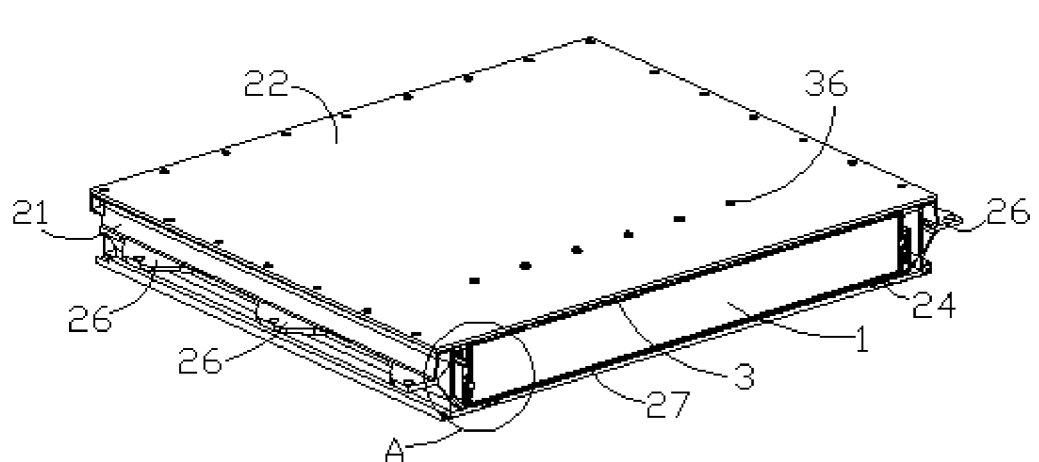
FIG. 3 is a cross-sectional view of a battery pack according to one embodiment of the present disclosure.
Figure 4:
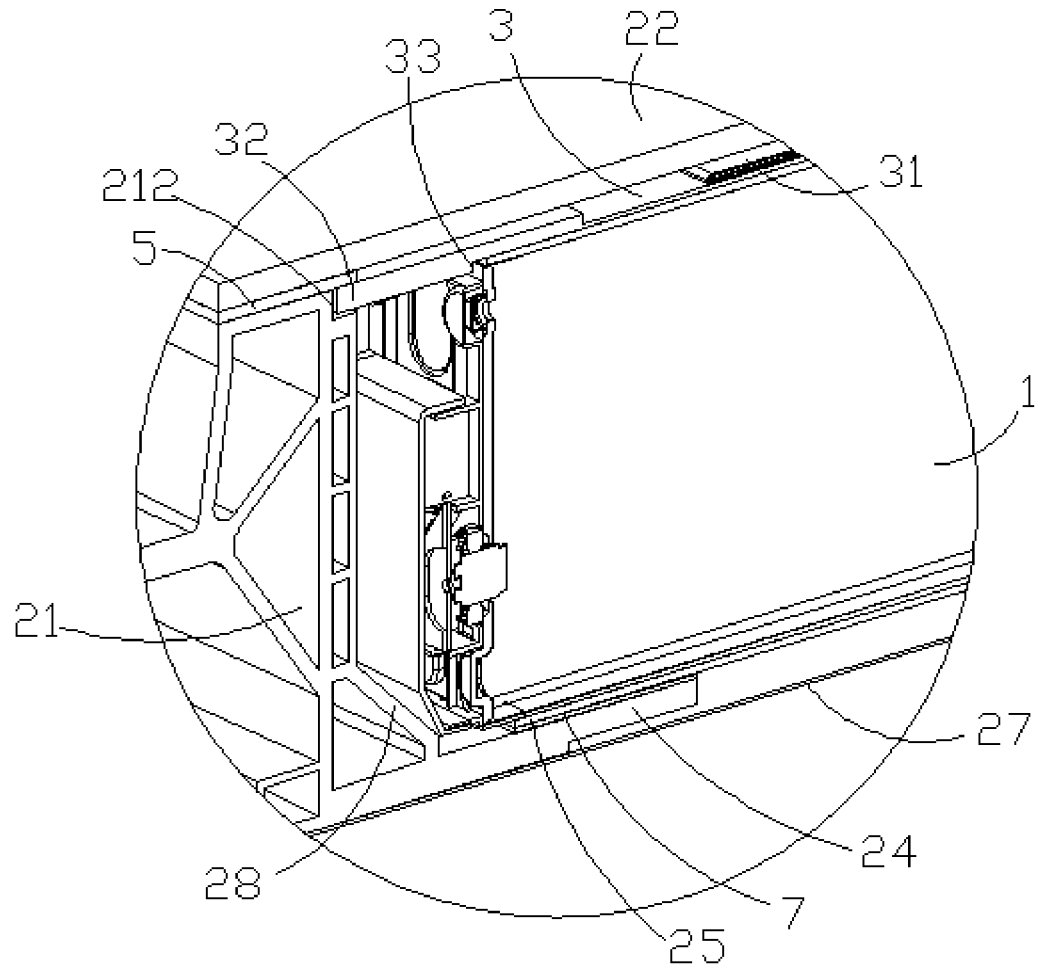
FIG. 4 is a partially enlarged view at A in FIG. 3.

As shown in FIGS. 3 and 4, in some embodiments of the present disclosure, the clamping slot 212 is provided on an inner surface of the first edge beam 21 facing the receiving space 211, and the first edge portion 32 is inserted into the clamping slot 212 of the first edge beam 21. The stability of the vapor chamber 3 supporting the first edge beam 21 is thereby improved, and by machining the clamping slot 212 on the first edge beam 21, the machining of the vapor chamber 3 can be simplified, which better meets the practical production requirements.

In some embodiments of the present disclosure, the first edge portion 32 contacts with or abuts against the bottom wall of the clamping slot 212, and the first edge portion 32 adheres to a side wall of the clamping slot 212. Since the first edge portion 32 can be securely positioned within the clamping slot 212, the stability and reliability of the vapor chamber 3 supporting the first edge beam 21 can be improved.

Meanwhile, the first edge portion 32 can be adhered to the side wall of the clamping slot 212 to further improve the connection strength between the vapor chamber 3 and the tray 2, such that the vapor chamber 3 can stably support the inside of the first edge beam 21. When the tray 2 is squashed or crushed, the tray 2 can transmit a force to the vapor chamber 3, thereby increasing the structural strength of the tray 2 and preventing the first edge beams 21 from being deformed to press the battery module 1 after being squashed, to protect the battery module 1 in the receiving space 211 and to make the operation of the battery module 1 safe and reliable.

As shown in FIGS. 1 to 4, in some embodiments of the present disclosure, the battery pack 1000 further includes a cover plate 22 located on the vapor chamber 3 and covers the top opening of the receiving space 211, and a sealing cushion 5 is provided between the cover plate 22 and the vapor chamber 3. The top opening of the receiving space 211 is sealed by the cover plate 22 to prevent external dust or liquid from entering the receiving space 211 to affect the operation of the battery module 1, thereby ensuring the smooth and reliable operation of the battery module 1.

A sealing cushion 5 is provided between the cover plate 22 and the vapor chamber 3, so that the top opening of the receiving space 211 can be better sealed by the sealing cushion 5, the sealing performance of the receiving space 211 can be improved, and the effects of vibration damping and noise reduction can be achieved.

In some embodiments of the present disclosure, the cover plate 22 is connected to the tray 2 using bolts and presses the sealing cushion 5, and the receiving space 211 is sealed due to the resilient properties of the sealing cushion 5.

As shown in FIGS. 3 and 4, in some embodiments of the present disclosure, the first edge portion 32 is located between the clamping slot 212 and the cover plate 22. Since both ends of the vapor chamber 3 are provided with the first edge portions 32, and the two first edge beams 21 of the tray 2 are provided with the clamping slots 212, the vapor chamber 3 can be stably supported between the two first edge beams 21 by extending the two first edge portions 32 of the vapor chamber 3 into the clamping slots 212 of the two first edge beams 21, thereby improving the structural strength of the tray 2.

By covering the vapor chamber 3 with a cover plate 22 such that the first edge portion 32 of the vapor chamber 3 is provided between the clamping slot 212 and the cover plate 22, the vapor chamber 3 can be clamped by the cooperation of the cover plate 22 and the clamping slot 212 to improve the stability of the vapor chamber 3 in the receiving space 211, thereby enabling the vapor chamber 3 to be stably supported between the two first edge beams 21 of the tray 2.

As shown in FIGS. 1 and 8-10, in some embodiments of the present disclosure, the battery pack further includes a number of cooling tubes 31 provided in sequence on the outer surface of the vapor chamber 3 facing away from the receiving space 211, and a heater provided between every two adjacent cooling tubes 31. As can be understood, the battery module 1 is heated by the heaters to satisfy the heating demand of the battery module 1 in a low-temperature environment to improve the service life of the battery module 1. The battery module 1 is cooled via the cooling tubes 31 to meet the cooling demand of the battery module 1 during charging and discharging, and to prevent the battery module 1 from being operated at a high temperature for a long time, thereby improving the service life of the battery module 1.

The heaters are provided between every two adjacent cooling tubes 31 to make full use of the space between the two adjacent cooling tubes 31, so that the distribution of the heaters and the cooling tubes 31 is relatively uniform. During heating or cooling of the battery module 1, heat can be relatively uniformly transferred, so that the efficiency of changing of the temperature is improved, and the structure of the vapor chamber 3 is more compact.

In some embodiments of the present disclosure, the cooling tubes 31 and the vapor chamber 3 are formed integrally by aluminum-extrusion, and the heaters are heating films 311. By making the cooling tubes 31 and the vapor chamber 3 as an integrated aluminum-extrusion member, the heating films 311 are provided on the vapor chamber 3, so that the connection structure between the heating films 311, the cooling tubes 31 and the vapor chamber 3 is more stable.

Figure 8:
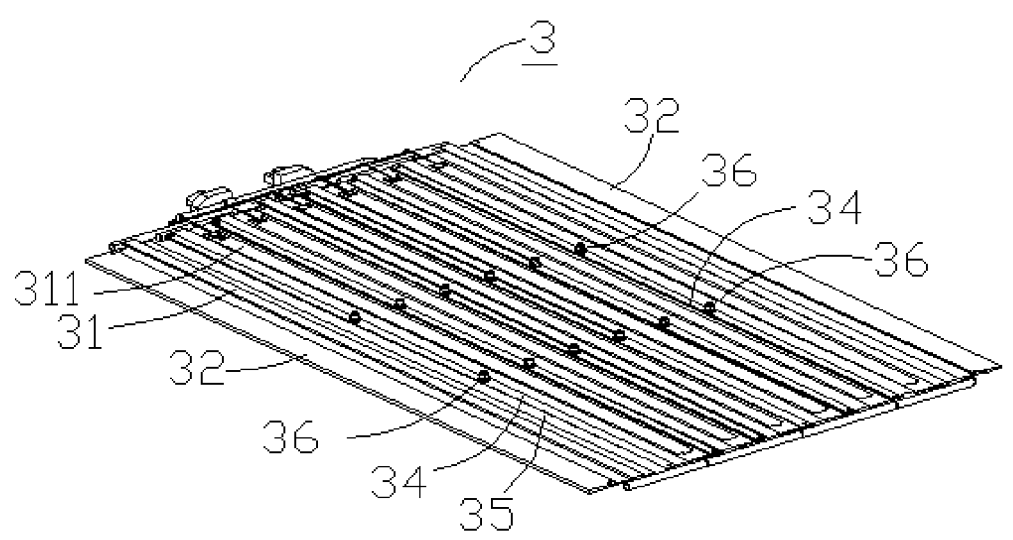
FIG. 8 is a schematic perspective view of a vapor chamber according to an embodiment of the present disclosure.
Figure 9:
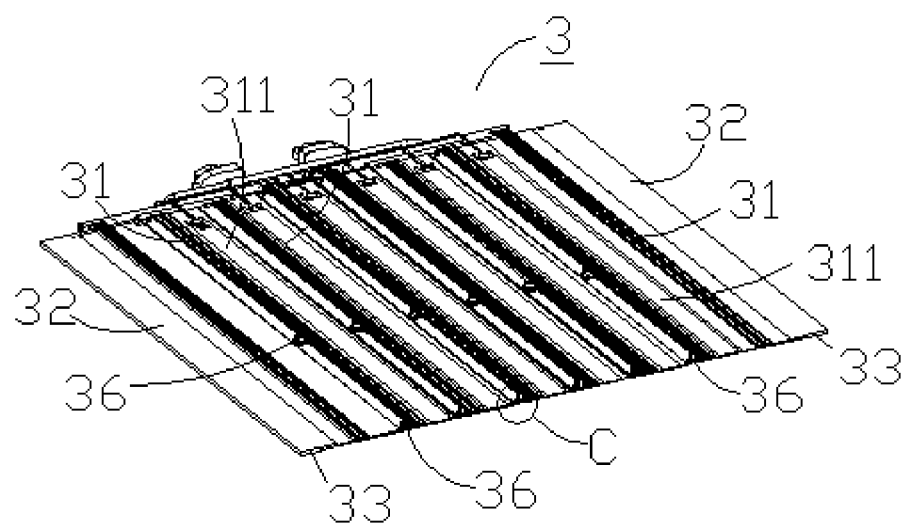
FIG. 9 is a cross-sectional view of a vapor chamber according to one embodiment of the present disclosure.
Figure 10:
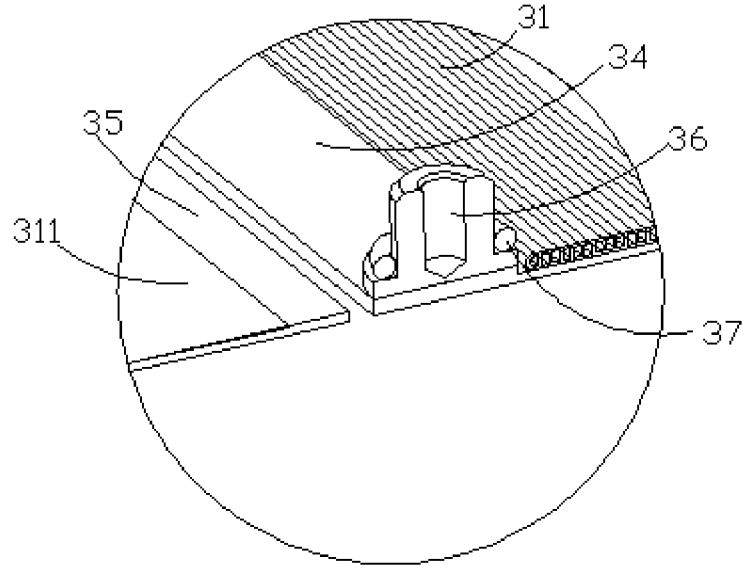
FIG. 10 is a partially enlarged view at C in FIG. 9.

As shown in FIGS. 1, 8, and 10, in some embodiments of the present disclosure, a thickness of the cooling tube 31 is greater than a thickness of the heating film 311.

As shown in FIGS. 1 to 7, in some embodiments of the present disclosure, the tray 2 further includes two second edge beams 29 provided opposite to each other and a reinforcing beam 23, the two first edge beams 21 and the two second edge beams 29 together enclose the receiving space 211, and the reinforcing beam 23 is provided in parallel with the second edge beams 29. The receiving space 211 is jointly enclosed by the two first edge beams 21 and the two oppositely provided second edge beams 29 to make the structure of the receiving space 211 more stable, to prevent the receiving space 211 from being deformed after being squashed for serving the purpose of protecting the battery module 1 in the receiving space 211, and to make the operation of the battery module 1 safe and reliable.

By making the extending direction of the reinforcing beam 23 parallel to the extending direction of the second edge beam 29, the reinforcing beam 23 is supported in the receiving space 211, so that the stability in the receiving space 211 can be further improved. Meanwhile, the vapor chamber 3 can be supported on the reinforcing beam 23 in the receiving space 211.

In some embodiments of the present disclosure, as shown in FIGS. 1 and 8-10, the vapor chamber 3 includes a connecting region 34, and a bearing region 35 other than the connecting region 34. A thickness of the connecting region 34 is greater than a thickness of the bearing region 35, and the connecting region 34 is connected to the reinforcing beam 23. The mounting stability of the vapor chamber 3 can be improved by connecting the connecting region 34 of the vapor chamber 3 to the reinforcing beam 23. Since the thickness of the connecting region 34 of the vapor chamber 3 is greater than that of the bearing region 35, the vapor chamber 3 can be firmly connected to the reinforcing beam 23.

In some embodiments of the present disclosure, the connecting region 34 of the vapor chamber 3 is riveted or screwed to the reinforcing beam 23. The connecting region 34 of the vapor chamber 3 may be riveted or screwed to the reinforcing beam 23 to make the connection between the vapor chamber 3 and the reinforcing beam 23 more secure and convenient and easy to operate.

As shown in FIGS. 1 and 8-10, in some embodiments of the present disclosure, a number of connecting regions 34 are provided at intervals on the vapor chamber 3 to improve the strength of the vapor chamber 3 and prevent the vapor chamber 3 from being bent.

Figure 6:
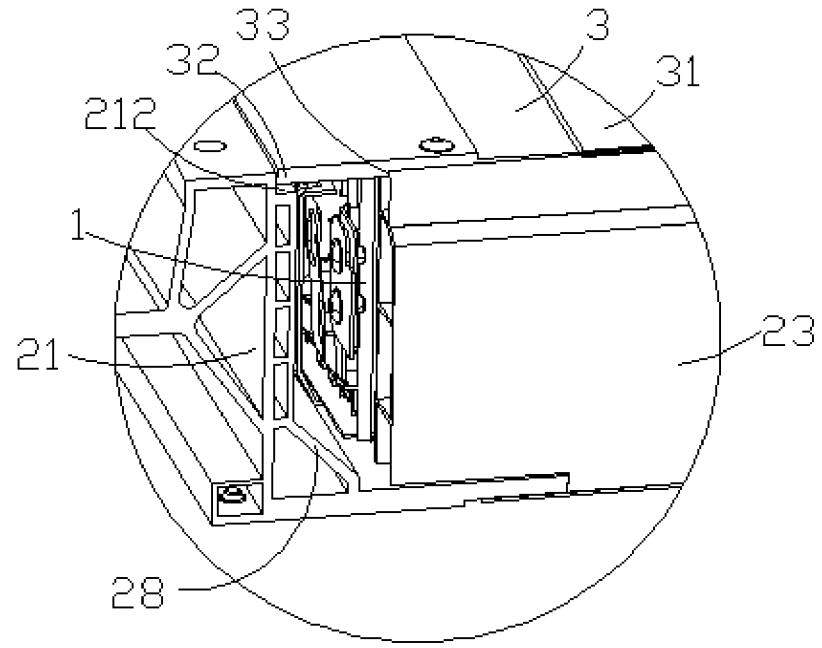
FIG. 6 is a partially enlarged view at B in FIG. 5.

As shown in FIGS. 5 and 6, in some embodiments of the present disclosure, a parallel direction of the reinforcing beam 23 and the second edge beam 29 is a lengthwise extension direction of the reinforcing beam 23. Two bosses 33 are provided on the inner surface of the vapor chamber 3 facing the receiving space 211, and the two bosses 33 respectively abut against two end surfaces of the reinforcing beam 23 along the parallel direction. By bringing the two bosses 33 of the second edge beam 29 into contact with the two reinforcing beams 23, respectively, the vapor chamber 3 is prevented from moving relative to the reinforcing beams 23, thereby improving the mounting stability of the vapor chamber 3 and enabling the vapor chamber 3 to stably support the tray 2, and further improving the structural strength of the tray 2 and preventing deformation of the tray 2.

As shown in FIGS. 1 and 8-10, in some embodiments of the present disclosure, the vapor chamber 3 is provided with a connecting member 36 for connection to a vehicle. The connecting member 36 is connected to the vehicle body to stably mount the battery pack 1000 on the vehicle body to improve a vibration mode of the battery pack 1000. In an embodiment, the connecting member 36 may be welded to the vapor chamber 3 to improve the connecting strength of the vapor chamber 3 and the connecting member 36. The number of the connecting members 36 on the vapor chamber 3 may be plural as long as the battery pack 1000 can be connected to the vehicle body, and the number of the connecting members 36 is not limited.

As shown in FIGS. 1 and 8-10, in some embodiments of the present disclosure, the connecting member 36 may be a nut and is sleeved with a sealing ring 37, a cover plate 22 is provided with a through hole 221, the connecting member 36 passes through the through hole 221, and the sealing ring 37 seals between the cover plate 22 and the connecting member 36, so as to ensure the sealing between the connecting member 36 and the through hole 221, thereby further ensuring the sealing of the receiving space 211. The connecting member 36 may be a bolt or a snap as long as the battery pack 1000 can be connected to the vehicle body, and the specific structure of the connecting member 36 is not limited herein.

As shown in FIGS. 1 to 5, in some embodiments of the present disclosure, a number of lugs 26 are provided on an outer surface of the tray 2, and a number of bolts are connected to the vehicle body after passing through the lugs 26, so that the battery pack 1000 is stably connected to the vehicle body, improving the vibration mode of the battery pack 1000.

As shown in FIGS. 3 to 6, in some embodiments of the present disclosure, insulating guide plates 28 are provided in the receiving space 211, and the mounting of the battery module 1 in the receiving space 211 is guided by the insulating guide plates 28, so that the battery module 1 is mounted easily. At the same time, the insulating guide plates 28 can ensure the insulation between the battery module 1 and the tray 2, so that the operation of the battery module 1 is smooth and reliable. In an embodiment, the insulating guide plate 28 is a plastic piece.

As shown in FIG. 4, in some embodiments of the present disclosure, a bottom of the receiving space 211 is provided with support portions 24, the tray 2 further includes a base plate 25 placed on each support portion 24, and the battery module 1 is placed on the base plate 25. It will be appreciated that the base plate 25 is provided on the support portion 24 at the bottom of the receiving space 211, and the battery module 1 is provided on the base plate 25, so that the battery module 1 can be stably provided in the receiving space 211. At the same time, when the tray 2 is squashed or crushed, the structural strength of the tray 2 is increased by the cooperation of the base plate 25 and the support portion 24, so that the tray 2 is prevented from being deformed, thereby protecting the battery module 1 in the receiving space 211.

As shown in FIGS. 1 and 4, in some embodiments of the present disclosure, the base plate 25 may be connected to the housing of the battery module 1 by the first structural adhesive 6 to improve the connection strength between the base plate 25 and the battery module 1, so that the battery module 1 is stably provided in the receiving space 211. At the same time, even when the base plate 25 is squashed, since the base plate 25 is connected to the housing of the battery module 1, the base plate 25 may transmit the force to the housing of the battery module 1 to further improve the smoothness of the operation of the battery module 1.

As shown in FIGS. 1 and 4, in some embodiments of the present disclosure, the base plate 25 may be connected to the support portion 24 via second structural adhesives 7 to ensure the tightness between the base plate 25 and the support portion 24, thereby further improving the tightness of the receiving space 211, improving the connection strength between the base 25 and the tray 2, further improving the structural strength of the tray 2, and preventing the tray 2 from deforming. In some embodiments of the present disclosure, the bottom of the tray 2 is further provided with a fender plate 27 to further increase the strength of the tray 2.

As shown in FIGS. 1 to 10, a vehicle according to an embodiment of the present disclosure includes a battery pack 1000 according to the above embodiment of the present disclosure.

According to the vehicle of an embodiment of the present disclosure, since the operation safety reliability of the battery module 1 can be improved, the operation safety and reliability of the vehicle can be improved.

In the descriptions of this specification, descriptions using reference terms "an embodiment", "some embodiments", "an exemplary embodiment", "an example", "a specific example", or "some examples" mean that specific characteristics, structures, materials, or features described with reference to the embodiment or example are included in at least one embodiment or example of the present disclosure. In this specification, schematic descriptions of the foregoing terms do not necessarily point at a same embodiment or example. Moreover, the specific features, structures, materials, or characteristics described may be combined in any one or more embodiments or examples in an appropriate manner.

Although the embodiments of the present disclosure have been shown and described, a person of ordinary skill in the art should understand that various changes, modifications, replacements and variations may be made to the embodiments without departing from the principles and spirit of the present disclosure, and the scope of the present disclosure is as defined by the appended claims and their equivalents.

What is claimed is:

1. A battery pack, comprising a tray and a thermal plate; wherein the tray comprises two first edge beams, and the two first edge beams are respectively disposed on two opposite sides of a receiving space having a top opening;

a plurality of cooling tubes disposed on an outer surface of the thermal plate facing away from the receiving space, wherein a heater is disposed between two adjacent cooling tubes;

the thermal plate is disposed at the top opening of the tray and comprises two opposite first edge portions, and the two first edge portions are respectively mounted on the two first edge beams; and one of a first edge beam and a corresponding first edge portion mounted thereon comprises an inner surface facing the receiving space and comprising a clamping slot, and the other one of the first edge beam and the corresponding first edge portion is inserted into the clamping slot.

2. The battery pack according to claim 1, wherein the clamping slot is disposed on an inner surface of the first edge beam facing the receiving space, and the corresponding first edge portion is inserted into the clamping slot.

3. The battery pack according to claim 2, wherein the corresponding first edge portion contacts with or abuts against a bottom wall of the clamping slot, and the corresponding first edge portion is adhered to a side wall of the clamping slot.

4. The battery pack according to claim 1, wherein the cooling tubes and the thermal plate are formed integrally by aluminum-extrusion, and the heater comprises a heating film.

5. The battery pack according to claim 4, wherein a thickness of the cooling tubes is greater than a thickness of the heating film.

6. The battery pack according to claim 1, wherein the tray comprises a reinforcing beam and two second edge beams disposed opposite to each other, the two first edge beams and the two second edge beams surround the receiving space, and the reinforcing beam is parallel with the two second edge beams.

7. The battery pack according to claim 6, wherein the thermal plate comprises a connecting region and a bearing region, a thickness of the connecting region is greater than a thickness of the bearing region, and the connecting region is connected to the reinforcing beam.

8. The battery pack according to claim 7, wherein the connecting region of the thermal plate vapor chamber is riveted or screwed to the reinforcing beam.

9. The battery pack according to claim 6, wherein the reinforcing beam is parallel to the two second edge beams along a lengthwise direction of the reinforcing beam, two bosses are disposed on the inner surface of the thermal plate facing the receiving space, and the two bosses respectively abut against two end surfaces of the reinforcing beam along the lengthwise direction.

10. The battery pack according to claim 1, wherein the thermal plate comprises a connecting member to connect to a vehicle.

11. The battery pack according to claim 1, further comprising a battery module disposed in the receiving space, wherein the thermal plate is bonded to the battery module.

12. The battery pack according to claim 1, further comprising a cover plate, wherein the cover plate is located on the thermal plate and covers the top opening of the receiving space, and a sealing cushion is disposed between the cover plate and the thermal plate.

13. A vehicle comprising a battery pack comprising a tray and a thermal plate, wherein the tray comprises two first edge beams, and the two first edge beams are respectively disposed on two opposite sides of a receiving space having a top opening;

a plurality of cooling tubes disposed on an outer surface of the thermal plate facing away from the receiving space, wherein a heater is disposed between two adjacent cooling tubes;

the thermal plate is disposed at the top opening of the tray and comprises two opposite first edge portions, and the two first edge portions are respectively mounted on the two first edge beams; and one of a first edge beam and a corresponding first edge portion mounted thereon comprises an inner surface facing the receiving space and comprising a clamping slot, and the other one of the first edge beam and the corresponding first edge portion is inserted into the clamping slot.

14. The vehicle according to claim 13, wherein the clamping slot is disposed on an inner surface of the first edge beam facing the receiving space, and the corresponding first edge portion is inserted into the clamping slot.

15. The vehicle according to claim 14, wherein the corresponding first edge portion contacts with or abuts against a bottom wall of the clamping slot, and the corresponding first edge portion is adhered to a side wall of the clamping slot.

* * * * *